(12) United States Patent
Onozuka (10) Patent No.: US 10,473,840 B2
(45) Date of Patent: Nov. 12, 2019

(54) OPTICAL FIBER COVERING STRUCTURE AND LIGHT EMITTING DEVICE USING THE SAME

(71) Applicant: NICHIA CORPORATION, Anan-shi, Tokushima (JP)

(72) Inventor: Katsuyuki Onozuka, Nagano (JP)

(73) Assignee: NICHIA CORPORATION, Anan-Shi, Tokushima (JP)

( * ) Notice: Subject to any disclaimer, the term of this patent is extended or adjusted under 35 U.S.C. 154(b) by 0 days.

(21) Appl. No.: 15/996,927

(22) Filed: Jun. 4, 2018

(65) Prior Publication Data
US 2018/0356580 A1 Dec. 13, 2018

(30) Foreign Application Priority Data
Jun. 8, 2017 (JP) .................................. 2017-113336

(51) Int. Cl.
*G02B 6/00* (2006.01)
*F21V 8/00* (2006.01)

(52) U.S. Cl.
CPC ............ *G02B 6/001* (2013.01); *G02B 6/0003* (2013.01); *G02B 6/004* (2013.01); *G02B 6/0016* (2013.01)

(58) Field of Classification Search
CPC ...... G02B 6/004; G02B 6/001; G02B 6/0003; G02B 6/0016
See application file for complete search history.

(56) References Cited

U.S. PATENT DOCUMENTS

2013/0314940 A1* 11/2013 Russert ............ C03B 37/01222
362/556

FOREIGN PATENT DOCUMENTS

| JP | 62-38611 U | 3/1987 |
|---|---|---|
| JP | 2000-147341 A | 5/2000 |
| JP | 2005-177360 A | 7/2005 |
| JP | 2007-227573 A | 9/2007 |
| JP | 4526339 B2 | 8/2010 |
| JP | 2013-079179 A | 5/2013 |
| JP | 2013-104701 A | 5/2013 |

* cited by examiner

*Primary Examiner* — Anne M Hines
(74) *Attorney, Agent, or Firm* — Squire Patton Boggs (US) LLP (57) ABSTRACT

An optical fiber covering structure includes an optical fiber and a covering layer surrounding the optical fiber. The covering layer includes a glass fiber layer formed with an assembly of glass fibers or a ceramic fiber layer formed with an assembly of ceramic fibers. The glass fibers or the ceramic fibers each contains at least one fluorescent material and/or at least one light-diffusing material.

22 Claims, 6 Drawing Sheets

OPTICAL FIBER COVERING STRUCTURE AND LIGHT EMITTING DEVICE USING THE SAME

CROSS-REFERENCE TO RELATED PATENT APPLICATION

The present application claims priority under 35 U.S.C. § 119 to Japanese Patent Application No. 2017-113336 filed on Jun. 8, 2017, the contents of which are hereby incorporated by reference in their entirety.

BACKGROUND

Field

The present disclosure relates to an optical fiber covering structure and a light emitting device using the same.

Description of Related Art

Various types of light emitting devices using an optical fiber have been developed. For example, Japanese Patent No. 4526339 describes a linear emitter that includes a light diffusing optical fiber having a clad that does not have a fluorescent material dispersed therein, and linear bodies made of a resin material having a fluorescent material dispersed therein twined around the light diffusing optical fiber.

However, conventional techniques have disadvantages as illustrated below.

In the case of a light emitting device configured to emit a laser light and employing a light-diffusing optical fiber, occurrence of damage such as a breakage of the optical fiber would cause the high energy laser light directly leaking to the outside, instead of emitting diffused light through the optical fiber. The leaking laser light may damage the linear bodies and further may be leaked to the outside. For this reason, there has been a room for improving the safety of such an optical fiber covering structure and a light emitting device using the same.

SUMMARY

Certain embodiments of the present disclosure are directed to provide an optical fiber covering structure and a light emitting device using the same that have high safety.

An optical fiber covering structure according to certain embodiments includes an optical fiber and a covering layer surrounding the optical fiber. The covering layer includes a glass fiber layer formed of an assembly of glass fibers or a ceramic fiber layer formed of an assembly of ceramic fibers. The assembly of glass fibers or the assembly of ceramic fibers each contains at least one fluorescent material and/or at least one light-diffusing material.

An optical fiber covering structure according to some embodiments includes an optical fiber and a covering layer surrounding the optical fiber. The covering layer includes a glass fiber layer formed of an assembly of glass fibers or a ceramic fiber layer formed of an assembly of ceramic fibers. The glass fiber layer or the ceramic fiber layer is impregnated in a resin that contains at least one fluorescent material and/or at least one light-diffusing material.

The light emitting device according to certain embodiments of the present disclosure includes a laser light source and the optical fiber covering structure described above allowing propagation of light that is emitted from the laser light source.

The optical fiber covering structure and the light emitting device using the same, according to certain embodiments of the present disclosure have high safety.

DETAILED DESCRIPTION

In the following, certain embodiments will be described with reference to the drawings. However, each of the following embodiments are to exemplify an optical fiber covering structure and a light emitting device using the same, for embodying the technical idea of the present invention, and the technical idea of the present invention is not limited to the following. Particularly, the sizes, materials, shapes and the relative positions of the members described in embodiments are given as an example and not as a limitation to the scope of the invention unless specifically stated. The sizes and the arrangement relationships of the members in each of drawings are occasionally shown exaggerated for ease of explanation. In the description below, the same designations or the same reference numerals denote the same or like members and duplicative descriptions will be appropriately omitted.

Figure 1A:
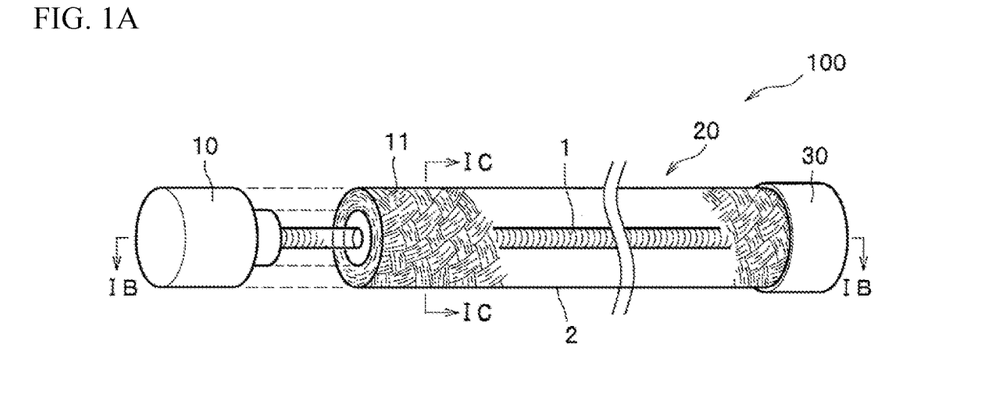
FIG. 1A is a schematic exploded perspective view illustrating a configuration of a light emitting device according to one embodiment.
Figure 1B:
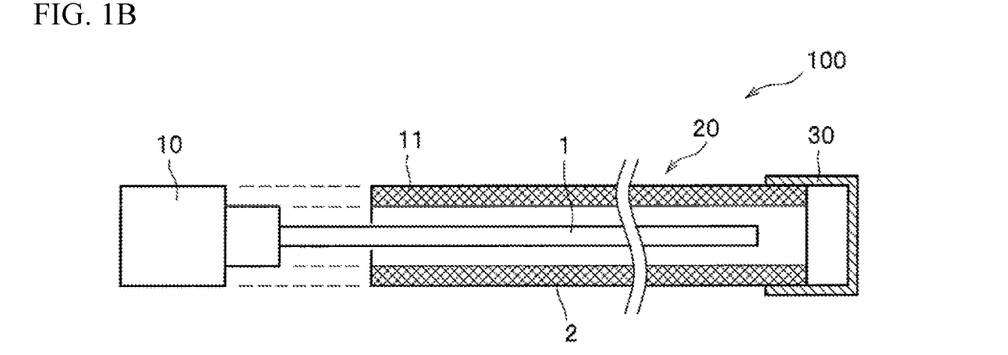
FIG. 1B is a schematic cross-sectional view illustrating a configuration of a light emitting device according to one embodiment, taken along line IB-IB of FIG. 1A.
Figure 1C:
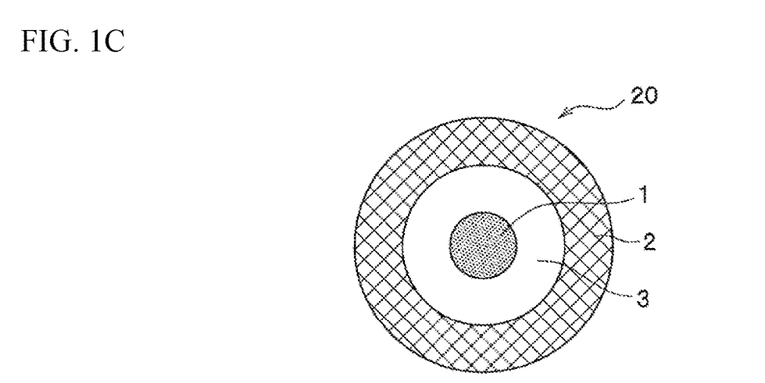
FIG. 1C is a schematic cross-sectional view illustrating a configuration of a optical fiber covering structure according to one embodiment, taken along line IC-IC of FIG. 1A.

As shown in FIG. 1A to FIG. 1C, a light emitting device 100 according to one embodiment can include a laser light source 10, an optical fiber covering structure 20 configured to allow propagation of light emitted from the laser light source 10, and a protective member 30 provided at an end of the optical fiber covering structure 20. FIG. 1A includes a partially transparent view for illustrating the optical fiber 1.

Figure 2:
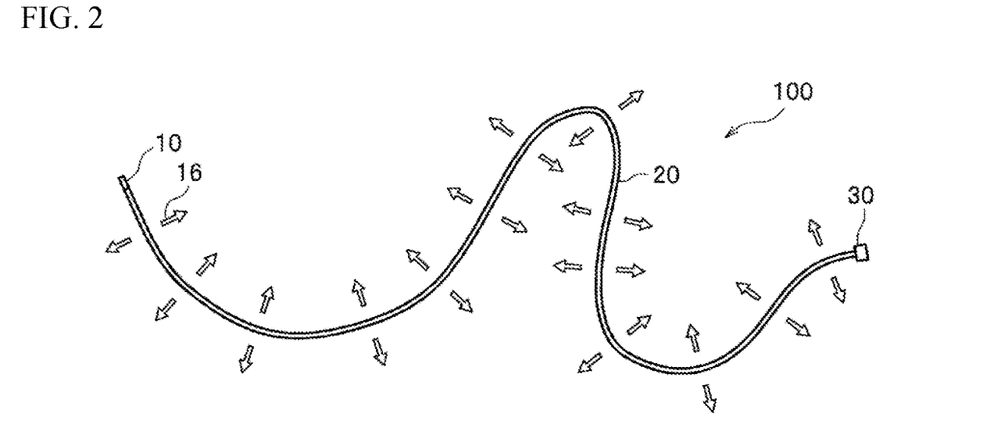
FIG. 2 is a schematic diagram illustrating a configuration of a light emitting device according to one embodiment.

The light emitting device 100 can employ a light diffusing optical fiber. A light diffusing optical fiber allows light transmitted from the laser light source 10 to transmit therethrough, thus, light emitted from the laser light source propagates in the optical fiber while emitting light with an intensity along the fiber. Accordingly, as shown in FIG. 2, the light emitting device 100 can emit light 16 that transmitted through the covering layer, from an entire circumference (periphery) along the length of the optical fiber covering structure 20. Further, the light emitting device 100 has a small outer diameter and flexibility that allows free bending. Accordingly, the light emitting device 100 can be easily formed in a desired shape and that can be formed compact.

The laser light source 10 is employed to provide light to the optical fiber 1 of the optical fiber covering structure 20. For the laser Light Source 10, for example, a laser diode (LD) can be used. With the use of an LD, a lighting device that can exhibit good initial drive performance and is resistant to repetitive ON/OFF operations, and has a small size and high optical output can be obtained. In particular, an LD has a higher optical density that that of an LED (light emitting diode), thus, the luminance of the light emitting device can be easily improved.

Not only one but also two or more laser light sources 10 may be used. With the use of a plurality of laser light sources 10, the amount of light can be increased and a higher luminance can be obtained.

More specifically, for the laser light source 10, a blue LD (peak wavelength in a range of 460 nm to 480 nm) can be used. In this case, in addition to the blue LD, a red LD (peak wavelength in a range of 620 nm to 700 nm) that does not excite the fluorescent material used in the lighting device may also be used. With the use of such a red LD, red component can be added, thus a lighting device of high color rendering and good color reproducibility can be provided.

The protective member 30 can be employed to protect an end of the optical fiber covering structure 20, and also to prevent the laser light from being discharged from the end of the optical fiber. For the protective member 30, for example, a metal such as aluminum, silver, copper, or iron, or an alloy of two or more of those metals, or a ceramic having good heat-resisting properties can be used. It is also possible to cover the end of the optical fiber covering structure 20 by the covering layer 2 to be described below, without the use of the protective member 30.

Next, the optical fiber covering structure 20 according to certain embodiments will be described.

As shown in FIG. 1A to FIG. 1C, the optical fiber covering structure 20 can include the optical fiber 1 and the covering layer 2.

The optical fiber 1 is employed to allow propagation of light emitted from the laser light source 10 and to discharge the light to the outside.

The optical fiber 1 can include a core positioned at its center in a cross section, and a cladding, which is a peripheral portion, surrounding the core. The optical fiber 1 made of a material such as quartz glass or plastic with a core having a refractive index greater than that of the cladding can transmit light with little attenuation.

The core preferably has a diameter in a range of about 50 μm to about 400 μm. With a diameter of the core about 50 μm or greater, light from the laser light source 10 can be introduced efficiently. With a diameter of the core about 400 μm or less, high flexibility can be obtained, allowing freedom in design.

The length of the optical fiber 1 can be determined according to the usage. The length of the optical fiber 1 is preferably 0.5 m or greater. With the length of the optical fiber 0.5 m or greater, the area that can be irradiated by the optical fiber 1 can be easily expanded. The use of a long optical fiber can realize a small diameter and flexible, long linear lighting, in this regards, a greater length of the optical fiber 1 is more preferable. On the other hand, in terms of economy, an upper-limit length may be 100 m, for example.

The covering layer 2 can be employed to surround and cover the optical fiber 1. The covering layer 2 can include a glass fiber layer formed with an assembly of glass fibers 11.

Figure 3:
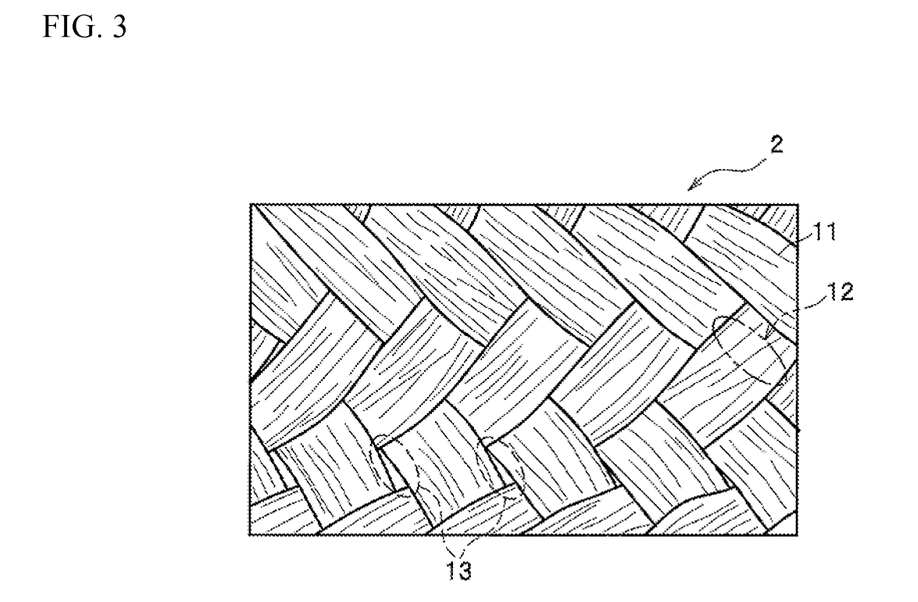
FIG. 3 is a schematic diagram illustrating a portion of a covering layer of a optical fiber covering structure according to one embodiment.

The glass fiber layer has a structure of a braided glass fibers 11, more specifically, has a braided structure of a plurality of bundles 12 of glass fibers 11 as shown in FIG. 3. In the specification, the term "braided structure" refers to a structure in which a plurality of glass fibers 11 are finely combined and interlaced to a braid shape. Examples thereof include a braid-like structure.

Figure 4A:
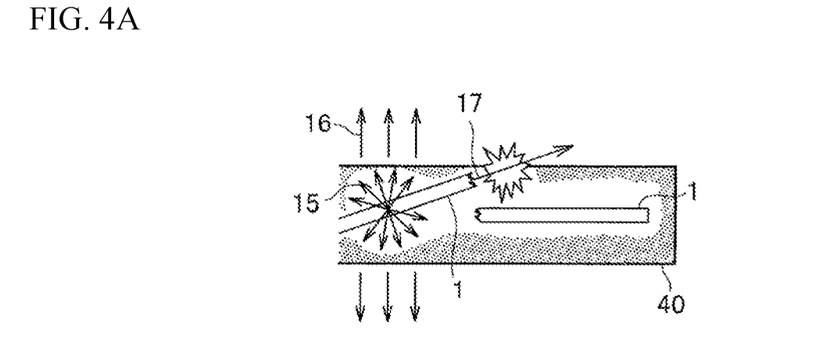
FIG. 4A is a schematic diagram illustrating leakage of laser light when a resin is used for the covering layer and the optical fiber is damaged.
Figure 4B:
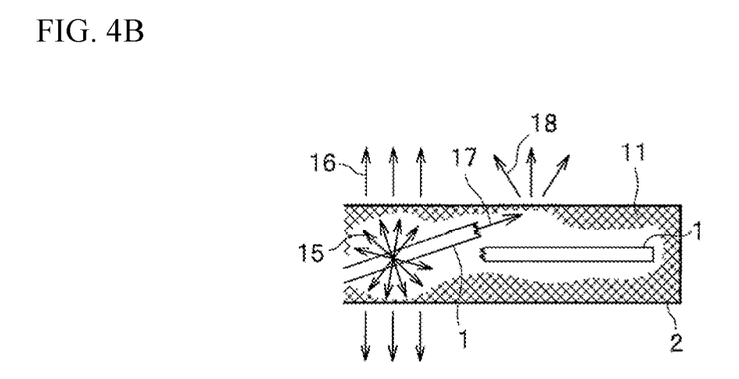
FIG. 4B is a schematic diagram illustrating leakage of laser light when a resin is used for the covering layer and the optical fiber is damaged.

As shown in FIG. 4A and FIG. 4B, while the light is propagating in the optical fiber 1, portions of the light is transmitted through the optical fiber 1 and further transmitted through the covering layer 40 or 2 and discharged to the outside. The portion of light 15 transmitted through the optical fiber 1 and the portion of light 16 transmitted through the covering layer 40 or 2 has a low optical density.

As shown in FIG. 4A, when a covering layer 40 made of a resin material is used, for example, if the optical fiber 1 is damaged and the laser light 17 is directly leaked from the damaged part to the outside without being transmitted through the optical fiber 1, the laser light 17 directly leaked from the optical fiber 1 has a narrow spread angle and high energy density, which may cause damage to the resin material of the covering layer 40. If the resin material of the covering layer 40 is damaged, direct leakage of the laser light 17 from the damaged part may result. In recent years, in particular laser light sources 10 with enhanced optical output of laser light have been employed, there may be high possibility that the leaked laser light 17 from the damage part of the optical fiber 1 damages the resin material of the covering layer 40 and the laser light 17 of high energy density is directly leaked to the outside. Moreover, even when the laser light 17 is not directly leaked to the outside, when the laser light 17 leaked from the damaged part of the optical fiber 1 is transmitted through the resin material of the covering layer 40, the laser light that has been transmitted through the resin material tends to have high energy density.

On the other hand, as shown in FIG. 4B, when the covering layer 2 includes a glass fiber layer, the laser light 17 leaked from the damaged part of the optical fiber 1 is transmitted through the covering layer 2 without damaging the covering layer 2, which reduces the optical energy density of the laser light, and is discharged to the outside as light 18 of low energy density.

The softening point of the glass fiber 11 is about 700° C. or higher, and thus the glass fiber 11 has a higher heat-resistant temperature than that of the resin material, and has good heat-resisting properties, and moreover, is flame-resistant. Accordingly, the glass fiber 11 has high resistance to the laser light 17 leaked from the damaged part of the optical fiber 1. Thus, the use of such a glass fiber layer as the covering layer 2 can improve safety, which can allow the use of a high-power laser as the laser light source 10, and thus can improve the luminance.

The laser light 17 leaked from the damaged part of the optical fiber 1 is repetitively refracted and/or reflected within the glass fiber layer and is discharged to the outside as diffused light. Accordingly, light 18 transmitted through the glass fiber layer has a low energy density, and thus improves the safety.

Moreover, the use of the glass fiber 11 can provide flexibility to the optical fiber covering structure 20.

The method of braiding the glass fibers 11 can be appropriately selected to obtain a glass fiber layer that does not include gaps that allow direct leaking of the light. Examples of the methods of braiding include oblique braiding, V-shaped braiding, braiding with three threads, braiding with four threads, and plain braiding.

In some cases, small gaps may be created between braiding threads of glass fibers 11 (between adjacent glass fibers 11) and little light is allowed to leak out from the gaps. Even in such a cases, the glass fiber layer can be structured such that the energy of light leaked from the minute gaps is within a range not to pose a safety concern.

More specifically, the configuration can be determined as described below. The optical energy directly leaking from the gap (leaking energy) with respect to the total optical energy leaking from the damaged part of the optical fiber can be expressed by:

(leaking energy)=(energy traveling in the core)×(total area of gaps)÷(cross-sectional area of the core perpendicular to the longitudinal direction of the core)

In the expression above, the term between brackets "total area of gaps" in the right side of the equation refers to a total area of gaps that are present within the irradiation of light discharged from the damaged part of the optical fiber 1 and that also directly connect the space enclosed by the covering layer 2 and the outside space.

Accordingly, influence of the gaps can be reduced by providing (total area of gaps)<(area of cross-section perpendicular to longitudinal direction of the core). Thus, when occurrence of gaps is unavoidable, a structure can be provided in view of the conditions described above so that the light leaked from the gaps can be reduced to a degree not to pose a safety concern.

When the covering layer 2 includes gaps that directly connect the inner space and the outside space between adjacent glass fibers 11, a cross-sectional area of the optical fiber 1 that is perpendicular to the longitudinal direction of the optical fiber 1 is preferably in a range of 26 times to 2,600,000 times with respect to the total area of the gaps in the cross-section.

Even in a case of leaking of light from gaps, when the cross-sectional area of the core of the optical fiber 1 is 26 times or greater with respect to the total area of the gaps between the glass fibers 11 in the cross-section in the cross section, the amount of optical energy leaking to the outside can be further reduced.

In order to reduce the exposure energy leaking from the gaps to 0.39 mW or less, the ratio described above would be about 26 times when the optical output of the laser light is 0.01 W and a diameter of the core is 400 μm, and about 2,600,000 times when the optical output of the laser light is 1,000 W and a diameter of the core is 50 μm.

The ratio of the cross-sectional area of the core of the optical fiber 1 to the total cross-sectional area of the gaps between adjacent glass fibers 11 can be determined based on Class 1 (inherently safe under all conditions of normal use that can reasonably be foreseen, when viewing a laser with the naked eye or with the aid of typical magnifying optics) according to IEC 60825-1 standard.

For example, when the conditions shown below are satisfied, the total cross-sectional area of the gaps between adjacent glass fibers 11 is 1/12821 or less of the cross-sectional area of the core of the optical fiber 1.

First, as a rough indication of safety of laser light leaking from the gaps directly connecting the inner space enclosed by the covering layer 2 and the outside space, the definition of Class 1 according to JIS C6802 (inherently safe when viewing a laser with the naked eye or with the aid of typical magnifying optics: amount of exposure energy Q, which is an amount of energy leaching the fundus of the human eye, is 0.39 mW or less at a wavelength of laser light in a range of 400 nm to 700 nm) established based on IEC 60825-1 was used.

Amount of exposure energy $Q = \rho \times A$ (where $\rho$ is an energy density of laser light, and A is a cross sectional area of laser light)

In the equation shown above, when the energy propagating in the core of the optical fiber 1 is 5 W, and the diameter of the core of the optical fiber 1 is 100 μm, if the total area of the gap directly connecting the inner space enclosed by the covering layer 2 and the outside space is greater than the 100 μm of the diameter of the core, the exposure energy would be 5 W which greatly exceeds 0.39 mW of Class 1 limits of JIS C6802.

Next, the total area of the gaps in the cross-section with which the amount of laser light leaking from the gaps that directly connect the inner space and the outside space to be 0.39 mW or less of the Class 1 limit is determined.

The condition requiring a minimum cross-sectional area of the gaps is in a case where the core is in contact with the inner wall of the covering layer 2.

The ratio of cross-sectional area of the core to the total cross-sectional area of gaps that directly connect the inner space enclosed by the covering layer 2 and the outside space that satisfies 0.39 mW or less of the amount of exposure energy of Class 1 limit is determined from the energy propagating in the core being 5 W/0.39 mW≈12821, such that the total cross-sectional area of the gaps is 1/12821 or less with respect to the cross-sectional area of the core. In other words, the cross-sectional area of the core to be 12821 times or greater with respect to the total cross-sectional area of the gaps between adjacent glass fibers 11.

In this case, the total cross-sectional area of gaps can be determined by $(100 \, \mu m/2)^2 \times \pi \approx 7854 \, \mu m^2$.

The total cross-sectional area of the gaps that directly connect the inner space enclosed by the covering layer 2 and the outside space that gives the exposure energy equal to or less than Class 1 limit is determined as 0.61 μm² or less, from the cross-sectional area of the core 7854 μm², divided by 12820 that gives≈0.61 μm².

As shown in FIG. 3, when a plurality of bundles 12 of glass fibers 11 are made into a yarn, gaps 13 may be created between a bundle 12 and another bundle 12. In such a case, by placing two or more layers of bundles 12 of the glass fibers 11 such that bundles 12 of second glass fibers 11 of a second layer is placed under the gaps 13 among bundles 12 of glass fibers 11 of a first layer, leaking of light from the gaps 13 can be prevented.

For the glass fibers 11, appropriate known glass fibers 11 can be employed. For example, long glass fibers can be employed.

The glass fibers 11 can have a cross section perpendicular to its length direction in a circular shape or a modified shape. Examples of modified cross-sectional shape include a non-circular cross-sectional shape such as an elliptic shape, a semicircular shape, a rectangular shape, a polygonal shape, a star shape, two circles of same diameter partially overlapping with each other, a C-shape, an H-shape, a W-shape, a chrysanthemum shape, and a multi-leaf shape such as a clover-leaf shape. Of those, a chrysanthemum shape is, for example, a circle with a wavy edge, and a clover-leaf shape is, for example, three or four circles partially overlapping in rotational symmetric manner.

When cross-sectional shapes of the glass fibers 11 in their length direction are circular, the diameters of the glass fibers 11 are preferably in a range of 1 μm to 10 μm. The diameters of the glass fibers 11 are preferably equal to or greater than the diameters of particles of a fluorescent material and/or a light diffusing material. In view of biological safety, the minimum diameter of the glass fiber 11 is preferably 6 μm or greater, more preferably 7 μm or greater.

The optical fiber covering structure 20 preferably has a cross-sectional area perpendicular to the length direction of the optical fiber 1 (i.e., a cross-sectional area of the optical fiber 1) in a range of 100 times to 2,250,000 times with respect to a cross-sectional area of a glass fiber 11 perpendicular to the length direction of the glass fibers 11 (cross sectional area of glass fiber 11).

When the cross-sectional area of the optical fiber 1 is in a range of 100 times to 2,250,000 times with respect to the cross-sectional area of a glass fiber 11, the glass fiber layer can be easily formed.

Figure 5:
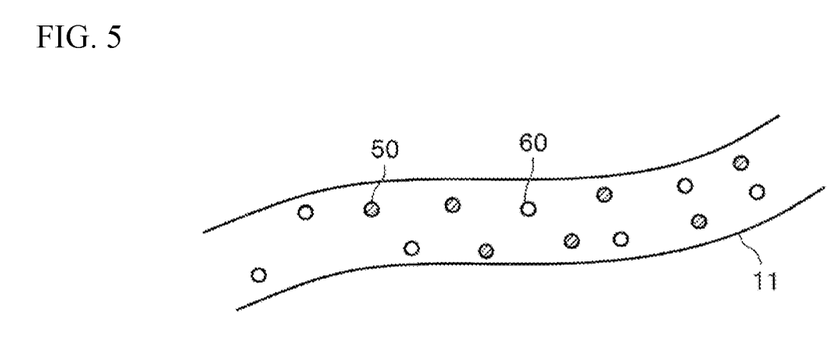
FIG. 5 is a schematic diagram illustrating a fluorescent material and a light diffusing material contained in a glass fiber.

As shown in FIG. 5, each glass fiber 11 contain a fluorescent material 50 and a light diffusing material 60. The fluorescent material 50 or the light diffusing material 60 may be contained, or both the fluorescent material 50 and the light diffusing material 60 may be contained.

With the inclusion of the fluorescent material 50 in each glass fiber 11, the fluorescent material 50 is excited by the light from the laser light source 10, and the light emitting wavelength range can be expanded. With the inclusion of the light diffusing material 60 in each glass fiber 11, the light from the laser light source 10 can be diffused.

Two or more different fluorescent materials 50 with different emission wavelengths may be employed and each of the fluorescent materials 50 are contained in different glass fibers 11 respectively, and a braid of glass fibers 11 each containing different fluorescent materials 50 may be formed. With this configuration, emission of a desired color can be obtained. Further, this configuration allows for an emission wavelength that cannot be obtained by using a single fluorescent material 50. Also, two or more different fluorescent materials 50 of different emission wavelengths may be contained in each of the glass fibers 11.

For the method for containing at least one fluorescent material 50 and/or at least one light diffusing material 60 in the glass fibers 11, a known method for containing a fluorescent material or the like in glass can be employed.

Examples of such a method include mixing at least one fluorescent material 50 and/or at least one light diffusing material 60 in a molten glass base material during manufacturing the glass fibers 11.

Also, a method using a sol-gel method may be employed. Such a method using a sol-gel method is described, for example, in Japanese Patent Publication No. 5713300. A general outline of this method will be described below. In the description below, a method for containing the fluorescent material 50 in the glass fibers 11 will be illustrated.

In the method, using a sol-gel reaction and an acid-base reaction, a fluorescent material-dispersed gel is produced from a fluorescent material-dispersed sol. A fluorescent material-dispersed sol that contains silicon alkoxide and a fluorescent material and further contains at least one metal chloride and/or at least one metal alkoxide is produced. Alternatively, a precursor sol is produced by using at least one metal chloride and/or at least one metal alkoxide, silicon alkoxide, and water, then a fluorescent material is dispersed in the precursor sol to produce a fluorescent material-dispersed sol.

The silicon alkoxide can be represented by $Si(OR)_4$, where alkyl group R in alkoxyl group (or alkoxy group) OR can be a methyl group, an ethyl group, a propyl group, or an isopropyl group. Thus, for the alkoxyl group OR, methoxy group, ethoxy group, propoxy group, isopropoxy group, or the like can be employed.

The metal chloride can be represented by $MCl_n$, and the metal alkoxide can be represented by $M(OR)_n$. M denotes a metal, OR denotes an alkoxyl group, and n denotes an integer corresponding to the species of the metal. For the alkyl group R in the alkoxyl group OR, a methyl group, an ethyl group, a propyl group, an isopropyl group, a butyl group, or the like can be employed. Thus, for the alkoxyl group OR, methoxy group, ethoxy group, propoxy group, isopropoxy group, butoxy group, or the like can be employed.

Subsequently, using a sol-gel method, a fluorescent material-dispersed gel is produced from the fluorescent material-dispersed sol.

It is preferable that after producing and before heating, the fluorescent material-dispersed sol is left to stand for aging at a temperature in a range of 10° C. to 50° C. for 1 hour or longer. With this treatment, the structure of the fluorescent material-dispersed gel can be strengthened, and a glass that is resistant to fracture can be produced. The gel is preferably aged for a longer time when a low temperature is employed. The upper limit of the aging time is not specifically limited, but production efficiency would decrease if the aging time exceeds 48 hours. Thus, the aging time is preferably set to 48 hours or less.

Subsequently, the fluorescent material-dispersed gel is heated to produce a fluorescent material-dispersed glass.

During the steps of producing the glass from the gel, using a method for fiber shape in a known method for producing glass fibers, glass fibers containing a fluorescent material can be produced.

Examples of a method for containing at least one fluorescent material 50 and/or at least one light diffusing material 60 in glass fibers 11 include a method described in Japanese Unexamined Patent Application Publication No. 2014-220289. A general outline of this method will be described below. In the description below, a method for containing the fluorescent material 50 in the glass fibers 11 will be illustrated.

A silane derivative and an alcohol are mixed, and water and an acid are added in drop to the mixture. Heat is applied to raise the temperature and in such state, the mixture is stirred. The stirring is kept until reaching room temperature to obtain a mixture solution. The temperature is preferably raised to a range of 20° C. to 50° C. The stirring in heating and raised temperature is preferably in a range of 2 hours to 4 hours. At the time of mixing the silane derivative and the alcohol, at least one metal chloride and/or at least one metal alkoxide may also be mixed.

Subsequently, ammonia water is added in drop to the mixture solution, and a fluorescent material powder is added to obtain a gel. The gel is then heated to increase the temperature and kept stand in the raised temperature to obtain a wet gel. The temperature is preferably raised to a range of 30° C. to 60° C.

Then, the solvent in the wet gel is replaced and supercritical drying is performed to obtain a dried gel with a plurality of pores and a low density is obtained. Examples of a solvent used in supercritical drying include alcohol such as methanol, ethanol, and isopropyl alcohol. Also, the solvent may be substituted to an organic solvent that allows easy handling such as acetone or hexane. Further, in the aim of preventing occurrence of cracks in the drying, a surface-treatment agent may be used. Examples of surface-treatment agents include silane agents such as hexamethyldisilane, trimethylsilane, and trimethylethoxysilane, and organic solvents such as heptane and butyl alcohol. The supercritical drying is preferably performed with $CO_2$ supercritical fluid under an atmosphere having a temperature and pressure above the critical point of carbon dioxide: the critical pressure of 7.38 Mpa and the critical temperature of 31.1° C.

Subsequently, the dried gel of low density is sintered at a temperature in a range of 800° C. to 1,050° C. to obtain a fluorescent material dispersed glass.

During the steps of producing the glass from the gel, using a method for fiber shape in a known method for producing glass fibers, glass fibers containing a fluorescent material can be produced.

Any fluorescent material that can be contained in the glass fibers 11 can be employed for the fluorescent material 50, and a known fluorescent material can be employed. Examples of the fluorescent materials include nitride-based phosphors, oxide-based phosphors, oxynitride-based phosphors, sulfide-based phosphors, oxysulfide-based phosphors, and halide-based phosphors. More specifically, alkaline-earth metal halogen apatite phosphors, alkaline-earth metal haloborate phosphors, and alkaline-earth metal aluminate phosphors, which are activated mainly with a lanthanoid element such as europium or with a transition metal element such as manganese, oxynitride-based phosphors or nitrides, which are activated mainly with a rare-earth element, and rare-earth aluminates and rare-earth silicates, which are activated mainly with a lanthanoid element such as cerium.

More specifically, when a blue LD (peak wavelength in a range of 430 nm to 480 nm) is used for the laser light source 10, examples of fluorescent materials that can employed for the fluorescent material 50 include, YAG to emit yellow light, LAG to emit green light, and $Sr_2Si_5N_8$:Eu, $Ca_2Si_5N_8$:Eu, $(Sr, Ca)_2Si_5N_8$:Eu, $CaAlSiN_3$:Eu, $(Sr, Ca)AlSiN_3$:Eu, Ca-sialon, and Sr-sialon respectively to emit red light.

The fluorescent material 50 may be an ionized substance such as praseodymium ion, terbium ion, erbium ion, or holmium ion. The fluorescent material 50 may be a light emitting substance which is called a quantum dot (or nanocrystal) material. Examples of the quantum dot materials include, a semiconductor material such as a group II-VI semiconductor, a group III-V semiconductor, and a group IV-VI semiconductor, more specifically, high dispersion particles of nano size made of, CdSe, core-shell type $CdS_xSe_{1-x}/ZnS$, and GaP. The quantum dot fluorescent material can be provided with a surface modification or stabilized with the use of a resin such as a PMMA (poly methyl methacrylate). Such an ionized fluorescent material, quantum dot fluorescent material, and other phosphors may be appropriately mixed and employed.

For the light diffusing material 60, a known light diffusing material can be employed. Examples thereof include titanium oxide, barium titanate, aluminum oxide, and silicon oxide.

In the optical fiber covering structure 20, a space 3 is provided between the optical fiber 1 and the covering layer 2.

The space 3 between the optical fiber 1 and the covering layer 2 can be formed by forming the covering layer 2 in a tube shape including a space, with an inward opening defined by a predetermined diameter, and inserting the optical fiber 1 in the space.

With the space 3 provided between the optical fiber 1 and the covering layer 2, for example, the necessity of precisely matching the diameter of the optical fiber 1 and the opening diameter defining the space 3 can be eliminated, and that can facilitate producing the covering layer 2. Also, insertion of the optical fiber 1 in the covering layer 2 can be facilitated.

The width of the space, which is a distance between the outer periphery of the optical fiber 1 and the inner periphery of the covering layer 2 can be, for example, in a range of 1 mm to 2 mm.

In the first embodiment described above, the optical fiber covering structure 20 and the light emitting device 100 are illustrated, but other configurations thereof can also be included as illustrated below. Next, other embodiments will be described.

In the optical fiber covering structure 20 described above, the fluorescent material 50 and the light diffusing material 60 were contained in the glass fibers 11. However, instead of containing the fluorescent material 50 and the light diffusing material 60 in the glass fibers 11, in other embodiments described herein, the glass fiber layer may be impregnated in a resin that contains the fluorescent material 50 and the light diffusing material 60.

Figure 6A:
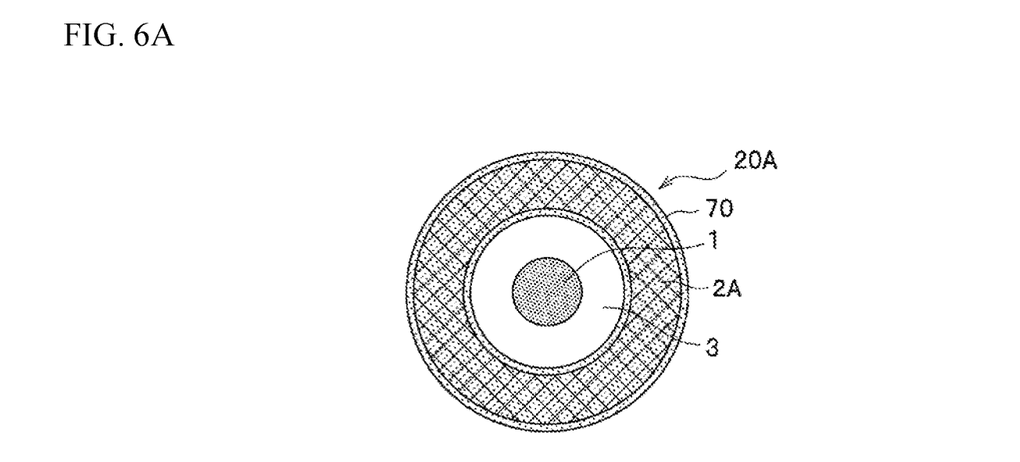
FIG. 6A is a schematic cross-sectional view illustrating a configuration of an optical fiber covering structure according to another embodiment, taken along line IC-IC of FIG. 1A.
Figure 6B:
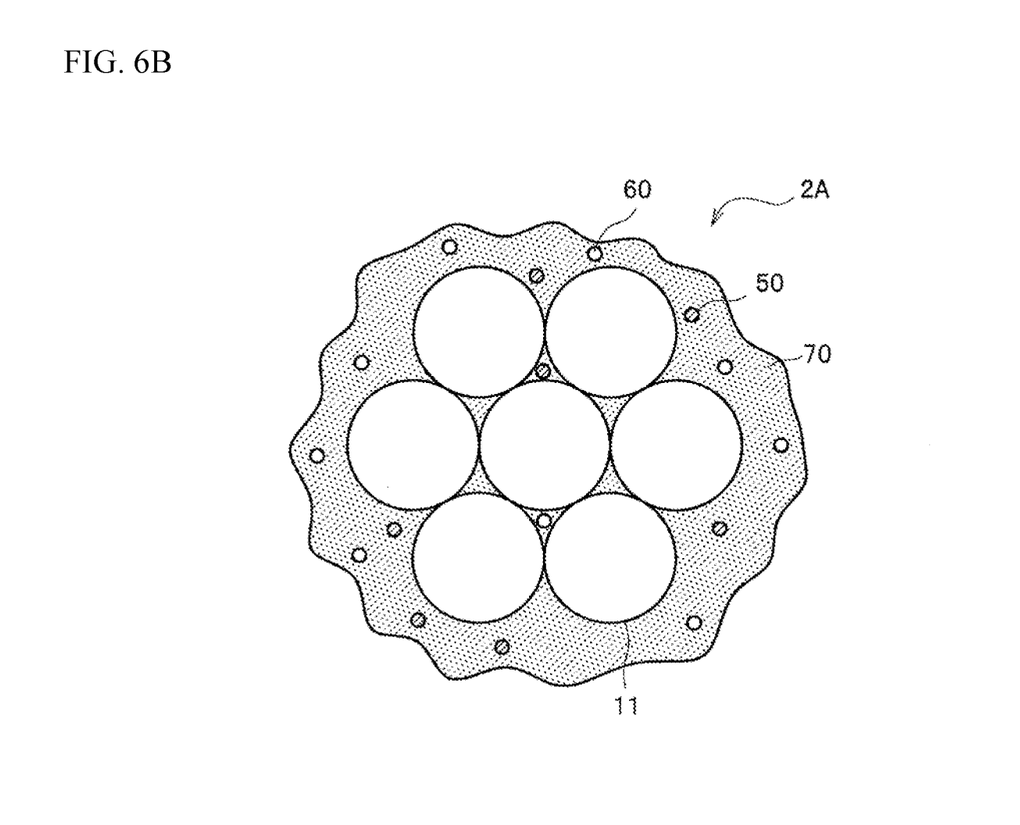
FIG. 6B is a schematic cross-sectional view illustrating a glass fiber layer being impregnated in a resin that contains a fluorescent material and a light diffusing material.

As shown in FIG. 6A and FIG. 6B, in the optical fiber covering structure 20A, the covering layer 2A that is the glass fiber layer made of an assembly of glass fibers 11 is impregnated in the resin 70 that contains the fluorescent material 50 and the light diffusing material 60. FIG. 6A schematically illustrates a state of the covering layer 2A impregnated in the resin 70, in which the fluorescent material 50 and the light diffusing material 60 are not shown for ease of understanding. FIG. 6B is a partially enlarged view of the covering layer 2A of FIG. 6A for ease of understanding, schematically illustrating a state of the glass fiber layer impregnated in the resin 70 that contains the fluorescent material 50 and the light diffusing material 60. The resin 70 may only present inside the glass fiber layer or may present inside the glass fiber layer and surroundings of the glass fiber extruded from the glass fiber layer.

The fluorescent material 50 or the light diffusing material 60 may be contained, or both the fluorescent material 50 and the light diffusing material 60 may be contained. The resin 70 may contain two or more different fluorescent materials 50 having different emission wavelengths.

Impregnating the glass fiber layer with a resin 70 can provide water-proof properties to the optical fiber covering structure 20. This also can prevent positional shift of the glass fibers 11 constituting the glass fiber layer.

Examples of the resin 70 include silicone resin, epoxy resin, modified silicone resin, and modified epoxy resin.

Examples of a method for containing a resin that contain at least one fluorescent material 50 and/or at least one light diffusing material 60 in the glass fiber layer include a method in which at least one fluorescent material 50 and/or at least one light diffusing material 60 is mixed in a resin solution formed by dissolving a resin, and glass fiber layer is impregnated therein. Another example is a method in which at least one fluorescent material 50 and/or at least one light diffusing material 60 is mixed in a resin solution and the mixture resin solution is applied on the glass fiber layer.

Further, an example of the method may be such that the glass layer is impregnated in the resin 70 that contains at least one fluorescent material 50 and/or at least one light diffusing material 60, while at least one fluorescent material 50 and/or at least one light diffusing material 60 is contained in the glass fibers 11.

Figure 7A:
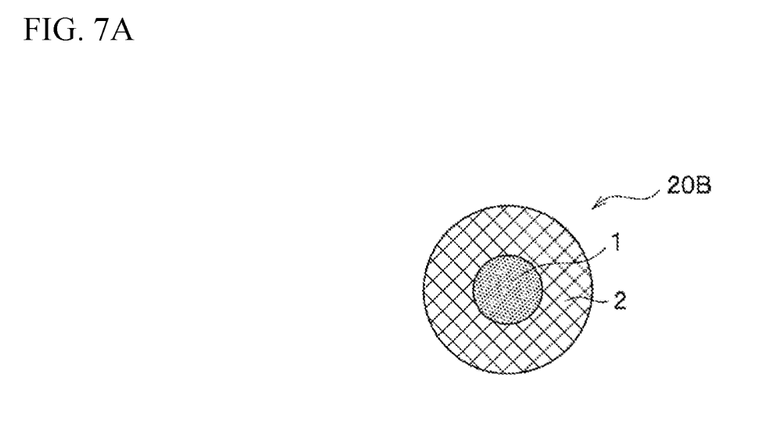
FIG. 7A is a schematic cross-sectional view illustrating a configuration of an optical fiber covering structure according to yet another embodiment, taken along line IC-IC of FIG. 1A.

As shown in the embodiment of FIG. 7A, in the optical fiber covering structure 20B, the optical fiber 1 and the covering layer 2 are closely in contact with each other. Thus, without providing a space between the optical fiber 1 and the covering layer 2, the covering layer 2 can be formed such that the glass fibers 11 are directly in contact with the optical fiber 1.

Because the optical fiber 1 and the covering layer 2 are closely contact with each other, positional shift of the covering layer 2 can be avoided. Also, the glass fibers 11 can be applied directly winding around the optical fiber 1 to form the covering layer 2, manufacturing can be facilitated. Alternatively, a hollow covering tube 2 with a predetermined inner diameter may be formed and the optical fiber 1 is inserted in the hollow tube to form the optical fiber covering structure 20.

Figure 7B:
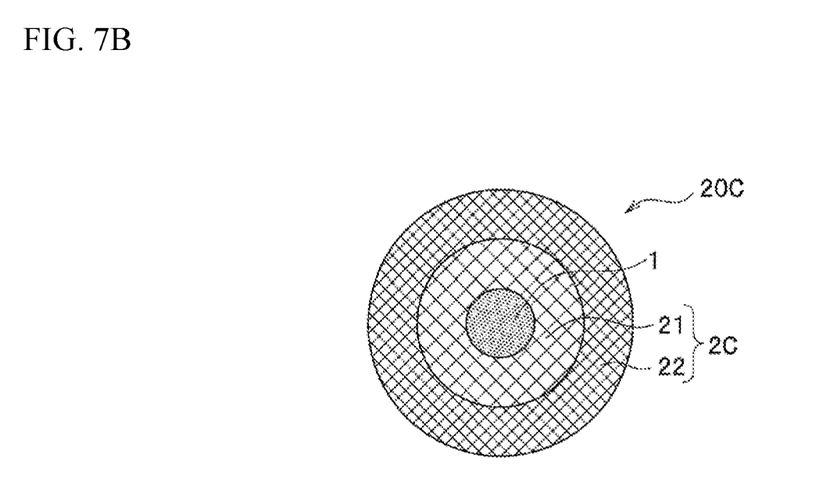
FIG. 7B is a schematic cross-sectional view illustrating a configuration of an optical fiber covering structure according to still another embodiment, taken along line IC-IC of FIG. 1A.

As shown in the embodiment of FIG. 7B, in the optical fiber covering structure 20C, the covering layer 2C includes a first glass fiber layer 21 surrounding the optical fiber 1, and a second glass fiber layer 22 surrounding the first glass fiber layer 21.

With this configuration, even when the first glass fiber layer 21 has gaps that allow little leakage of light, the second glass fiber layer 22 is provided to cover the gaps. Thus, even such little leakage of light can be prevented. If the second glass fiber layer 22 has gaps that allows little leakage of light, the second glass fiber layer 22 can be arranged such that the gaps of the first glass fiber layer 21 and the gaps of the second glass fiber layer 22 do not overlap with each other.

Further, the glass fibers 11 constituting the first glass fiber layer 21 and the glass fibers 11 constituting the second glass fiber layer 22 may contain one or more fluorescent materials 50 having different emission wavelengths such that the emission wavelength(s) of the fluorescent material(s) in the first glass fiber layer 21 is (are) different from the emission wavelength(s) of the fluorescent material(s) in the second glass fiber layer 22. Alternatively may be such that the first glass fiber layer 21 contains a resin containing one or more fluorescent materials 50 and the second glass fiber layer 22 contains a resin containing one or more fluorescent materials 50 having different emission wavelength(s) from that contained in the first glass fiber layer 21.

In the optical fiber covering structure 20 described above, the covering layer 2 is formed with a braid of the glass fibers 11, but the covering layer 2 may be formed by coiling the glass fibers 11 around the optical fiber 1. The covering layer 2 may also be formed such that the glass fibers 11 are bundled with the optical fiber 1, in which the glass fibers 11 are placed lengthwise along the optical fiber, with aligning the ends of the glass fibers 11 together at the both ends, thus, the optical fiber 1 is arranged in the assembly of the glass fibers 11.

In the optical fiber covering structure 20C described above, the covering layer 2C includes the first glass fiber layer 21 and the second glass fiber layer 22, but the covering layer may include three glass fiber layers, in which a third glass fiber layer surrounds the second glass fiber layer 22. The covering layer may include four or more glass fiber layers.

The optical fiber covering structure 20 described above has a circular cross-sectional shape, but the optical fiber covering structure 20 may have a modified cross-sectional shape.

Also, in the embodiments described above, the covering layer has one or more glass fiber layers each formed with an assembly of glass fibers. Alternatively, the covering layer may have one or more ceramic fiber layers each formed with an assembly of ceramic fibers. Each of the configurations described above can be applicable to the covering layer having one or more ceramic fiber layers as well as the covering layer having one or more glass fiber layers. According to the ceramic fibers to employ, appropriate modifications may be applied.

For the ceramic fibers, appropriate known ceramic fibers can be employed. Examples thereof include alumina fiber, silicon carbide fiber, silica fiber, mullite fiber, zirconia fiber, potassium titanate fiber, and ceramic fiber (a general term for artificial mineral fibers mainly made from alumina and silica).

As described above, the optical fiber covering structure and the light emitting device using the same according to the embodiments have good safety.

The optical fiber covering structure and the light emitting device using the same according to the embodiments have a small outer diameter and flexibility, and can emit light from its entire circumference.

Also, optical transmission over a long distance can be performed easily.

Further, the optical fiber covering structure according to the embodiments can be connected with ease and efficiently to a laser light source.

Also, in the light emitting device according to the embodiments, the optical fiber covering structure is spaced apart from the laser light source that generates heat, allowing for a reduction in the temperature of the optical fiber covering structure, and thus it is possible to improve the luminous efficiency. Moreover, when applied to plant factories, the reduction in the temperature of the optical fiber covering structure can realize an improvement in cultivating density and a reduction of air conditioning cost.

The optical fiber covering structure and the light emitting device using the same according to the present disclosure can be applied in, for example, indicators, lighting devices, display devices, backlight light sources of liquid crystal displays, projector apparatus, laser display devices, and endoscopes.

Numerous modifications and variations of the present invention are possible in light of the above teachings. It is therefore to be understood that within the scope of the appended claims, the invention may be practiced otherwise than as specifically described herein.

What is claimed is:
1. An optical fiber covering structure, comprising:
   an optical fiber; and
   a covering layer surrounding the optical fiber, the covering layer comprising a glass fiber layer formed with an assembly of glass fibers or a ceramic fiber layer formed with an assembly of ceramic fibers,
   the glass fibers or the ceramic fibers each containing at least one of a fluorescent material and a light-diffusing material.

2. The optical fiber covering structure according to claim 1, wherein the glass fiber layer comprises a braid of the glass fibers.

3. The optical fiber covering structure according to claim 1, wherein the glass fiber layer comprises a braid of a plurality of bundles of the glass fibers.

4. The optical fiber covering structure according to claim 1, wherein a space is provided between the optical fiber and the covering layer.

5. The optical fiber covering structure according to claim 1, wherein the optical fiber and the covering layer are firmly in contact to each other.

6. The optical fiber covering structure according to claim 1, wherein the covering layer includes a first glass fiber layer surrounding the optical fiber and a second glass fiber layer surrounding the first glass fiber layer.

7. The optical fiber covering structure according to claim 1, wherein the glass fiber contains two or more fluorescent materials having different light-emitting wavelengths.

8. The optical fiber covering structure according to claim 1, wherein the glass fiber has a circular or a modified cross section perpendicular to a longitudinal direction of the glass fiber.

9. The optical fiber covering structure according to claim 1, wherein the covering layer includes gaps between adjacent glass fibers, and a cross-sectional area of a core of the optical fiber in the cross-section perpendicular to a longitudinal direction of the glass fiber is in a range of 26 times to 2,600,000 times with respect to a total cross-sectional area of the gaps in the cross-section.

10. The optical fiber covering structure according to claim 1, wherein a cross-sectional area of the optical fiber perpendicular to a longitudinal direction of the optical fiber is in a range of 100 times to 2,250,000 times with respect to a cross-sectional area of the glass fiber perpendicular to a longitudinal direction of the glass fiber.

11. A light emitting device, comprising:
a laser light source; and
the optical fiber covering structure according to claim 1, configured to allow propagation of light emitted from the laser light source.

12. An optical fiber covering structure, comprising:
an optical fiber; and
a covering layer surrounding the optical fiber, the covering layer comprising a glass fiber layer formed of a plurality of glass fibers or a ceramic fiber layer formed of a plurality of ceramic fibers,
the glass fiber layer or the ceramic fiber layer impregnated with a resin containing at least one of a fluorescent material and a light-diffusing material.

13. The optical fiber covering structure according to claim 12, wherein the glass fiber layer comprises a braid of the glass fibers.

14. The optical fiber covering structure according to claim 12, wherein the glass fiber layer comprises a braid of a plurality of bundles of the glass fibers.

15. The optical fiber covering structure according to claim 12, wherein a space is provided between the optical fiber and the covering layer.

16. The optical fiber covering structure according to claim 12, wherein the optical fiber and the covering layer are firmly in contact to each other.

17. The optical fiber covering structure according to claim 12, wherein the covering layer includes a first glass fiber layer surrounding the optical fiber and a second glass fiber layer surrounding the first glass fiber layer.

18. The optical fiber covering structure according to claim 12, wherein the glass fiber contains two or more fluorescent materials having different light-emitting wavelengths.

19. The optical fiber covering structure according to claim 12, wherein the glass fiber has a circular or a modified cross section perpendicular to a longitudinal direction of the glass fiber.

20. The optical fiber covering structure according to claim 12, wherein the covering layer includes gaps between adjacent glass fibers, and a cross-sectional area of a core of the optical fiber in the cross-section perpendicular to a longitudinal direction of the glass fiber is in a range of 26 times to 2,600,000 times with respect to a total cross-sectional area of the gaps in the cross-section.

21. The optical fiber covering structure according to claim 12, wherein a cross-sectional area of the optical fiber perpendicular to a longitudinal direction of the optical fiber is in a range of 100 times to 2,250,000 times with respect to a cross-sectional area of the glass fiber perpendicular to a longitudinal direction of the glass fiber.

22. A light emitting device comprising:
a laser light source; and
the optical fiber covering structure according to claim 12, configured to allow propagation of light emitted from the laser light source.

* * * * *